United States Patent [19]
Stevens et al.

[11] Patent Number: 5,883,998
[45] Date of Patent: Mar. 16, 1999

[54] BACKPLANE CONNECTORS WITH SEPARABLE ELECTRICAL AND OPTICAL CONNECTORS

[75] Inventors: Rick C. Stevens, Apple Valley; Gerald F. Sauter, Eagan, both of Minn.

[73] Assignee: Lockheed Martin Corporation, Bethesda, Md.

[21] Appl. No.: 802,486

[22] Filed: Feb. 20, 1997

[51] Int. Cl.$^6$ ...................................................... G02B 6/36
[52] U.S. Cl. ............................................................ 385/134
[58] Field of Search ................................. 385/134, 88–94

[56] References Cited

U.S. PATENT DOCUMENTS

| | | | |
|---|---|---|---|
| 4,840,451 | 6/1989 | Sampson et al. ........................ | 385/89 |
| 5,091,991 | 2/1992 | Briggs et al. ........................... | 385/82 |
| 5,126,845 | 6/1992 | Yamashita ............................... | 358/160 |
| 5,337,388 | 8/1994 | Jacobowitz et al. ...................... | 385/76 |
| 5,436,997 | 7/1995 | Makiuchi et al. ........................ | 385/92 |
| 5,452,388 | 9/1995 | Rittle et al. ............................. | 385/92 |

*Primary Examiner*—Hung N. Ngo
*Attorney, Agent, or Firm*—Carl L. Johnson; Glenn W. Bowen

[57] ABSTRACT

A backplane assembly for a cluster of modules with the backplane assembly comprised of an electrical backplane and an optical backplane which has optical connectors that extend through openings in the electrical backplane to thereby share a connector shell with the electrical backplane with the clearance between the optical connectors and the electrical backplane sufficiently great so as to permit the optical backplane to be attached or detached from the cluster of modules without having to disconnect the electrical backplane.

13 Claims, 4 Drawing Sheets

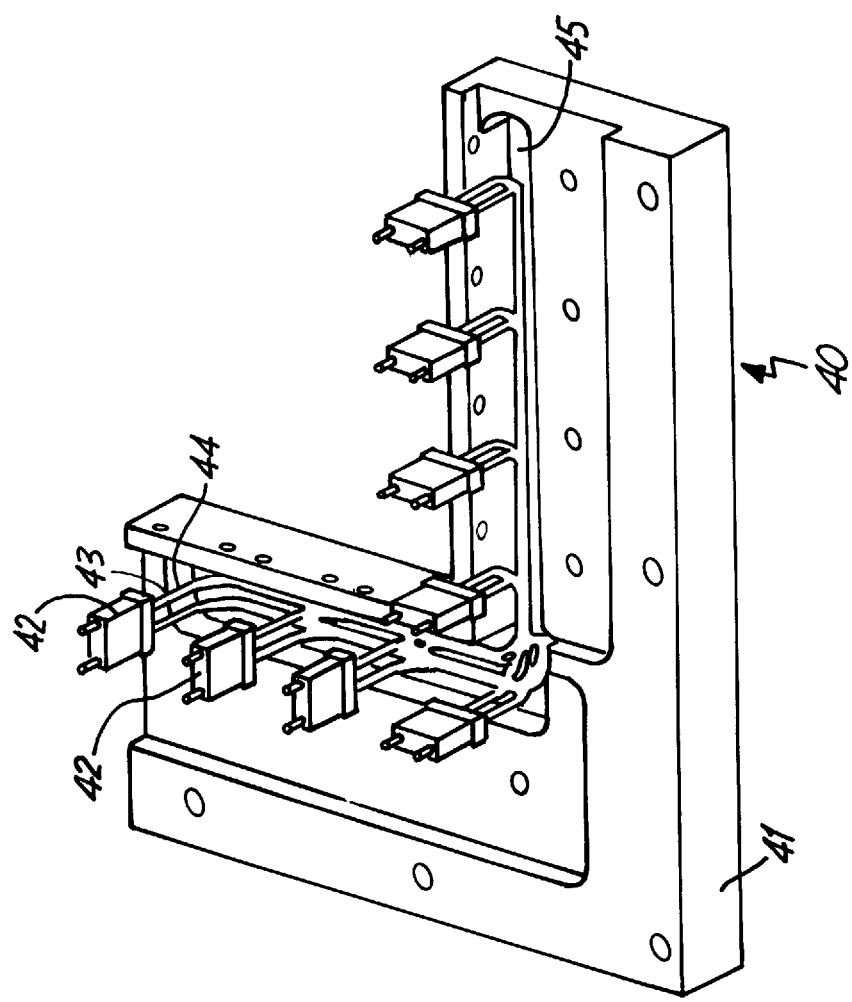

BACKPLANE CONNECTORS WITH SEPARABLE ELECTRICAL AND OPTICAL CONNECTORS

This invention was made with Government support under Contract No. N00163-93-C-0072 awarded by the United States Navy. The Government has certain rights in this invention.

FIELD OF THE INVENTION

This invention relates generally to connectors and, more particularly, to high capacity connectors for providing separate but simultaneous electrical and optical connections between electronic system modules with at least one of the connectors being connectably free of and connectably independent of the other.

BACKGROUND OF THE INVENTION

With the increasing sophistication and complexity of control systems using clusters of modules interconnected by a common network or backplane it becomes increasingly necessary to have high bandwidth connections between the modules. Most of the current common networks use an electrical backplane to provide electrical transmission between modules through a gang of mechanical pin type connectors. In order to provide higher bandwidth transmission between modules it is preferred to use an optical backplane because the optical backplane provides higher transmission rates, has greater noise immunity, and is not limited by the number of modules or the length of the physical path between modules. In order to provide the benefits of both an electrical backplane and an optical backplane the optical backplane has been formed as an integral part of the electrical backplane so that integral backplane can be connected or disconnected as a unit.

The present invention provides an improved common network that allows one to have the benefits of both optical backplanes and electrical backplanes without having to connect or disconnect both the electrical backplane and the optical backplane as an integral unit. The present invention provides a removable and separable optical backplane that has optical connectors that can be inserted through openings in the electrical backplane and into optical engagement with the electronic system modules. Thus the invention permits the optical backplane to be connected directly to the system modules when the electrical backplane is connected to the system modules and allows the optical backplane to be disconnected from the system modules and removed from the electrical backplane without having to either disconnect or reconnect the electrical backplane. By permitting one to have an optical backplane that is free of the electrical backplane it allows one to physically remove the optical backplane from the electrical backplane which permits easy repair and maintenance as well as more flexibility in design of the system.

SUMMARY OF THE INVENTION

Briefly, the invention comprises a nonintegral but side by side backplane assembly with the nonintegral backplane assembly comprised of an electrical backplane and an optical backplane sharing a connector shell with the optical backplane capable of being independently attached or detached to a cluster of modules without having to disconnect the electrical backplane from the modules or free the optical backplane from the electrical backplane.

BRIEF DESCRIPTION OF THE DRAWINGS

FIG. 6 is a perspective *view of an optical backplane with a chamber for the connecting leads.

DESCRIPTION OF THE PREFERRED EMBODIMENT

Figure 1:
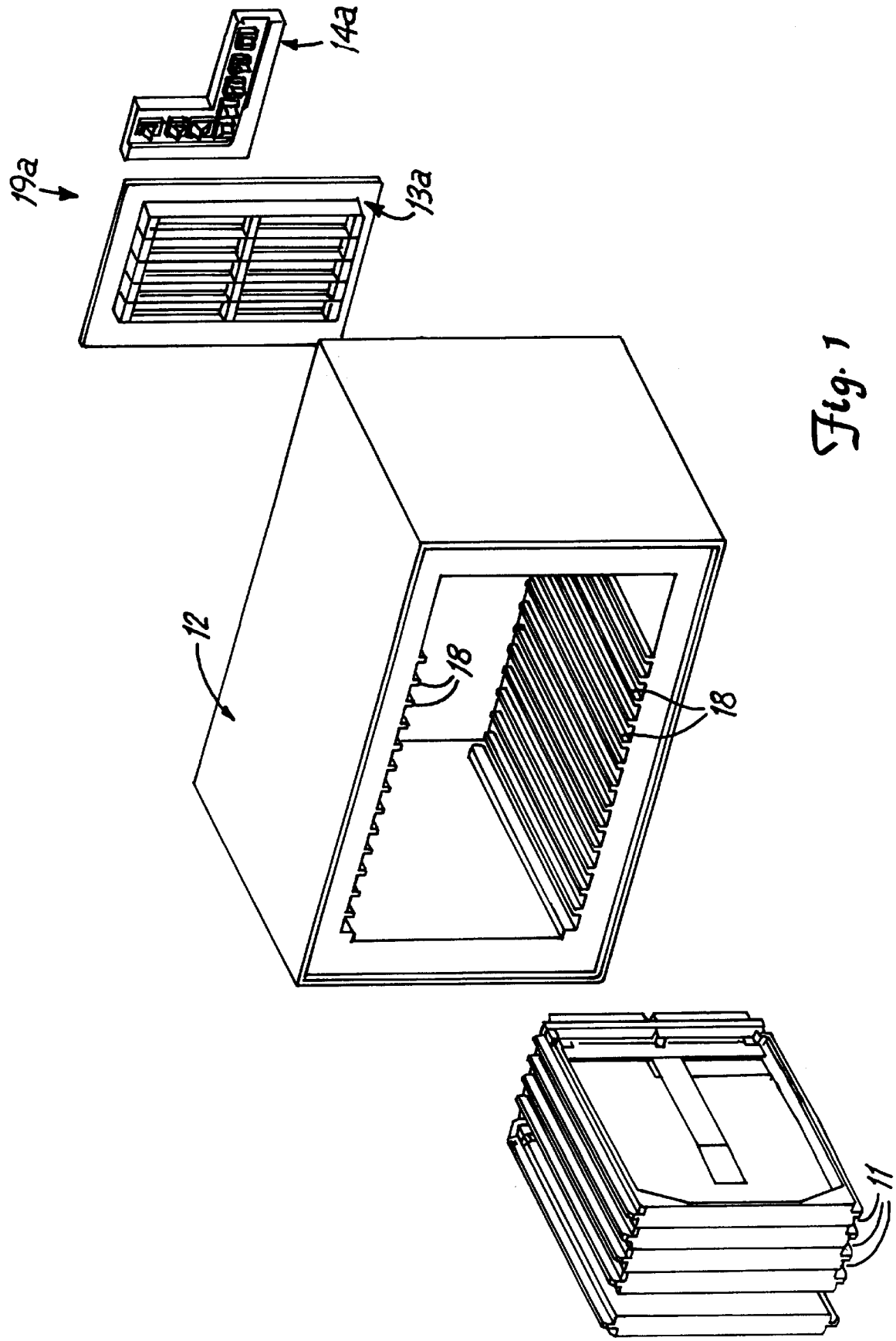
FIG. 1 shows an exploded view of a system with both an electrical and optical backplane.

FIG. 1 shows an exploded view of a system with a plurality of electronic system modules 11 for mounting in a chassis 12. The modules 11 fit in spaced apart condition within a set or parallel channels 18 located along opposite interior sides of chassis 12. Once the modules are mounted within chassis 12 the modules can be interconnected through a single backplane 19a that contains a gang of both optical and electrical connectors that are integrally mounted to each other to form a single backplane 19a. That is, in operation optical backplane 14a and electrical backplane 13a are secured to each other so the composite backplane 19a can be attached or detached as a unit.

In the present invention the modules 11 are also interconnected through a backplane assembly 19 (FIG. 4) comprising an electrical backplane 13 and an optical backplane 14; however, in contrast to an integral electrical and optical backplane assembly the electrical backplane and optical backplane of the present invention are connectably free of each other so that both the electrical backplane and the optical backplane are attachably and detachably independent of each other. Thus in conventional usage as shown in FIG. 1 the electrical backplane 13a and the optical backplane 14a are connected to each other to form a common backplane 19a that can be attached or detached as a unit while in the present invention the electrical and optical backplane are connectably free of each other so the two backplanes are independently connectable of each other.

Figure 2:
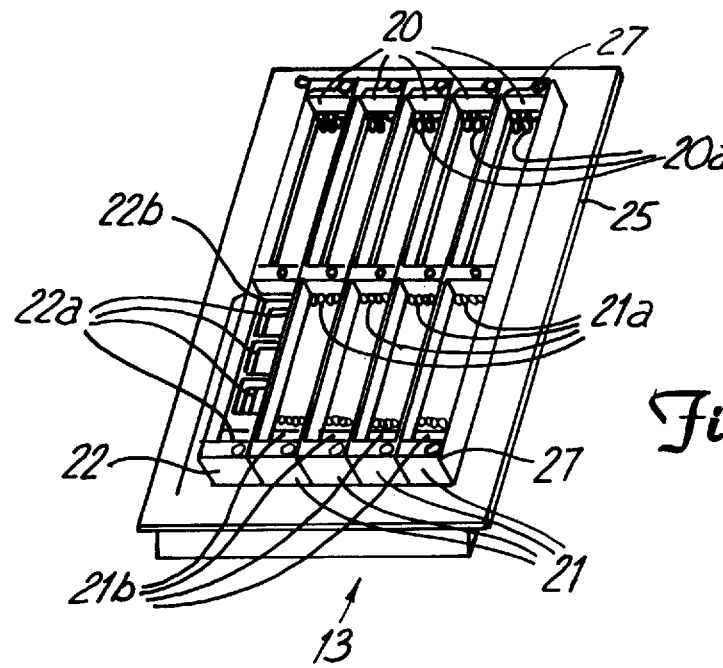
FIG. 2 a perspective view of an electrical backplane.

FIG. 2 illustrates electrical backplane 13 of the present invention with a plurality of openings for the optical backplane 14 of the present invention. The backplanes 13 and 14 are configured so that the electrical backplane 13 has openings of sufficient size and clearance so that the connectors of the optical backplane 13 can be inserted therethrough to engage the optical connectors on the modules without having the electrical backplane and the optical backplane secured to each other.

More specifically, FIG. 2 shows a perspective view of electrical backplane 13 comprising a Printed Wiring Board (PWB) base 25 with a gang of connectors shells 20 and 21 located thereon. The first set of shells 20 include multiple pin connectors 20a therein for forming a mechanical and electrical connection with mating connectors in modules 11. Located below the first set of multiple pin connectors 20a is a second set of shells 21 including multiple pin connectors 21a and openings 21b which are each defined by flanges within the connector shell. Located proximate to the first four connector shells 21 is a third identical connector shell 22. The connector shell 22 is free of any mechanical pin type connectors but does include a plurality of regular spaced openings 22a which are defined by interior member 22b. The gang arrangement of connector shells in regular rows permits the electrical backplane to be attached to the multiple modules 11 which are located in chassis 12. That is, each of the connector shells connects to only one module but the entire backplane 13 connects to all of the modules.

In assembly of the electrical backplane 13 to a plurality of modules 11 the electrical backplane 13 is secured to chassis 12 and modules 11. Guide pins on modules 11 are inserted into holes 27 to hold electrical backplane 13 in position with respect to modules 11 while the multiple pin connectors 20a and 21a provide for both mechanical and electrical interconnection between the clusters of modules 11 and the electrical backplane 13. Thus in the first step one connects the electrical backplane 13 to modules 11.

Viewing the electrical backplane assembly of FIG. 2 it is apparent that while multiple interconnections can be made to the various modules there is a plurality of spaced openings within the shell of the electrical backplane. These openings are sufficiently large so as to accommodate insertion of optical backplane connectors or members therethrough without frictional or mechanical interference that would preclude the optical backplane members from properly attaching to the modules 11. FIG. 2 shows the optical connectors located in a side by side relationship to the mechanical connectors with the optical backplane connectably free of the electrical backplane.

Figure 3:
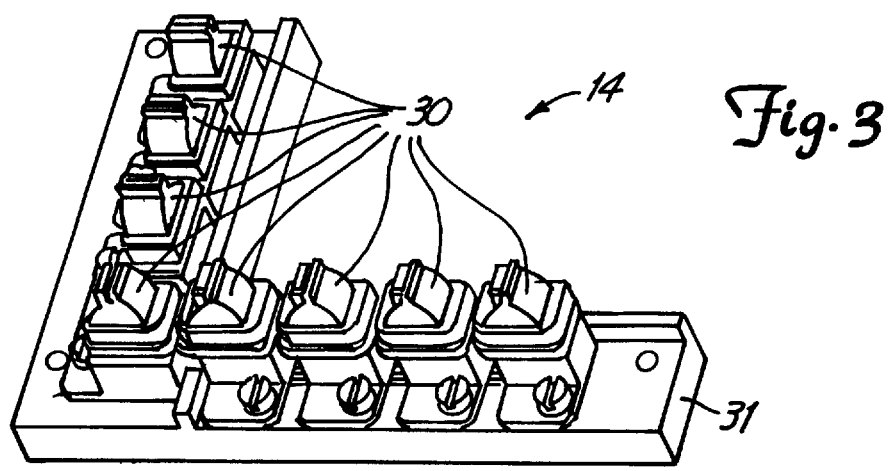
FIG. 3 shows a perspective view of the optical backplane.

FIG. 3 shows a perspective view of the optical backplane 14 comprised of a base 31 and a plurality of optical connectors 30 for providing optical connections to mating optical connectors in modules 11. Optical backplane 14 is sized such that the individual optical connectors 30 fit entirely within the openings 29a and 21b to enable the optical backplane 14 to be freely attached or detached from the modules 11 in the chassis 12 while the electrical backplane 13 remains connected to the modules 11. That is, optical backplane 14 is separable and supportable by the optical connectors and is not an integrally or connected part of the electrical backplane.

Figure 4:
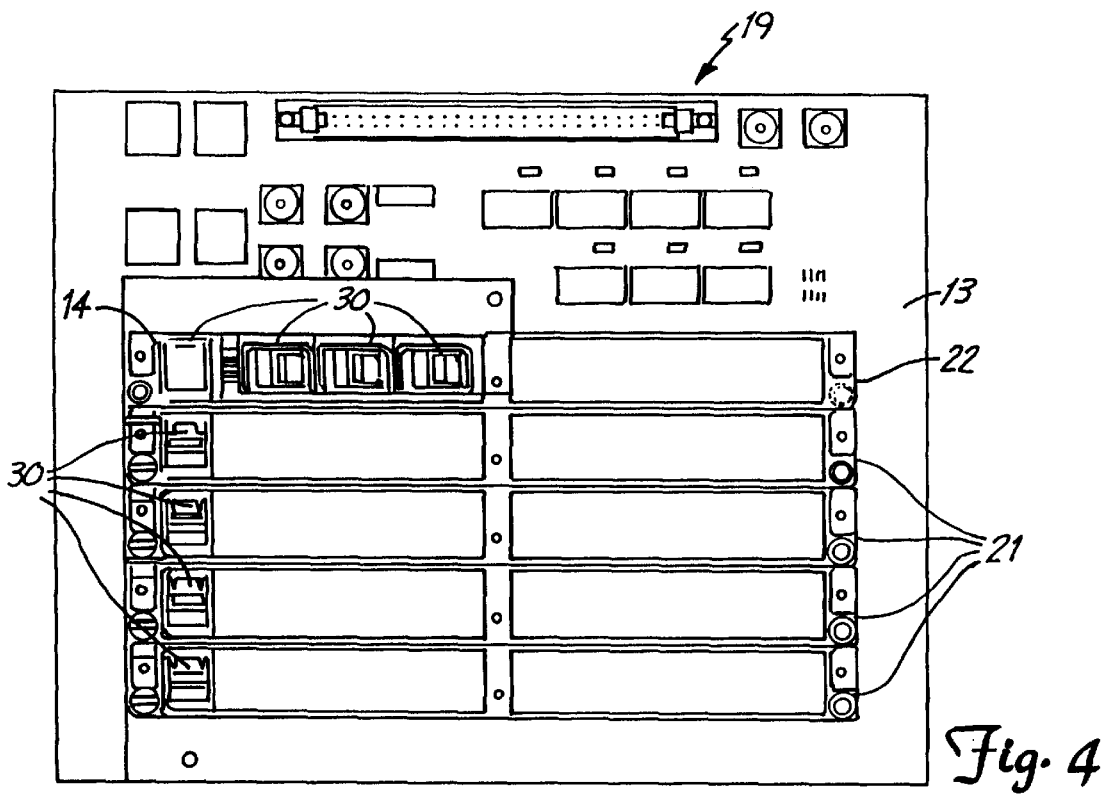
FIG. 4 shows a plane view of the backplane assembly with the optical backplane of FIG. 3 separable mounted within the shell of the electrical backplane of FIG. 1.

FIG. 4 shows a plane view of the electrical and optical backplane assembly 19 with the optical connectors 30 of optical backplane 14 extending through the openings in electrical backplane 13. FIG. 4 shows that optical backplane 14 mates to the electrical backplane with the optical connectors 30 clearingly fitting within the confines of the openings in the electrical backplane 13 assembly to present the appearance of an integrated optical and electrical backplane assembly 19 but lacking the connection therebetween to act as an integral unit.

Figure 5:
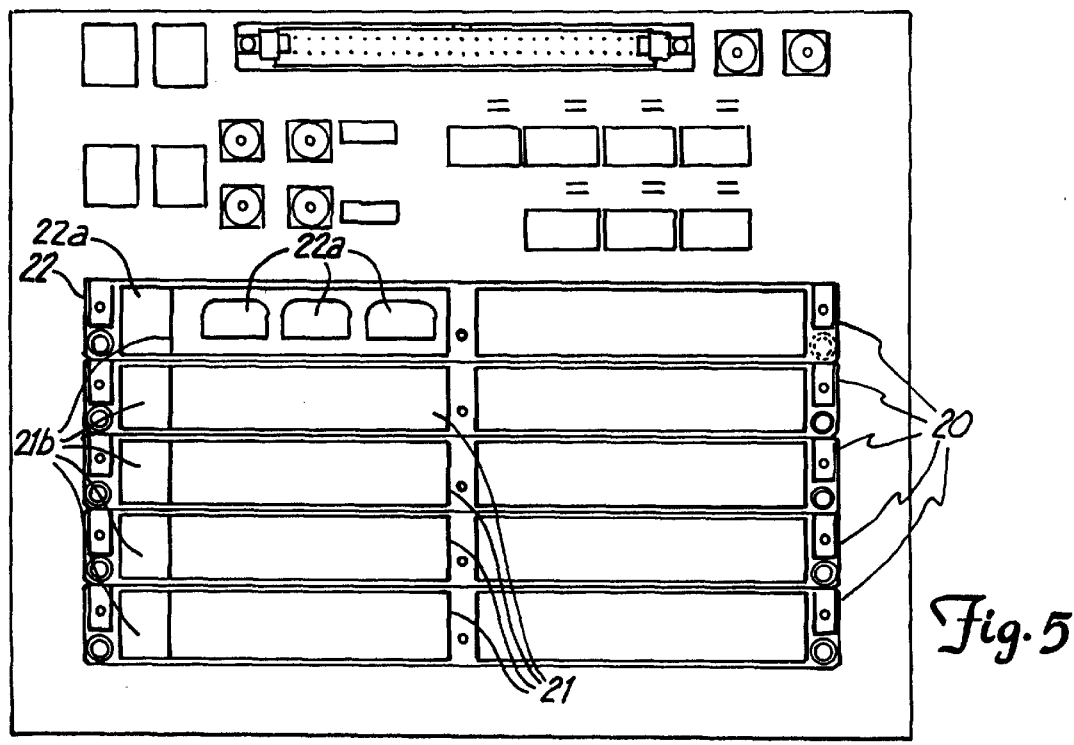
FIG. 5 is a plane view of the electrical backplane of FIG. 2.

FIG. 5 shows a plane view of the electrical backplane 13 showing the openings 21b and 22a within each of the connector shells 21 and 22 where the optical connectors can be fitted therethrough. In the embodiments shown there is sufficient clearance between the outside dimension of the optical connectors 30 and the openings 21b and 22a so that the optical connectors are surrounded but not carried by the electrical backplane. That is, the electrical backplane assembly does not carry or interfere with the optical connectors 30 but provides access openings 21b and 22a that are sufficiently larger than the optical connectors 30 to enable the optical connectors on the optical backplane 14 to be connected or disconnected from the chassis modules 11 without having to disturb the electrical backplane 13.

FIG. 6 shows an optical backplane 40 for carrying a plurality of optical connectors 42 therein. Optical backplane 40 includes a solid base 41 having an elongated L-shaped chamber 45 located therein for containing the connecting leads 43 and 44 between optical connectors 42. The optical connectors 42 are shown protruding beyond the optical backplane 40 in order to form optical engagement through the openings in an electrical backplane. The connecting leads 43 and 44 can be contained entirely within chamber 45 in base 41, thus eliminating the need for having the optical leads extending beyond the backplane. Thus, the present invention provides for an optical backplane that carries the optical connectors in a protruding position for engagement through an opening in an electrical backplane and a chamber within the optics backplane base for carrying the connecting leads between optical connectors. While the optical backplane base is shown as having an L-shape other shape backplane bases can be formed such that the shape of the backplane base matches the configuration of the optical backplane that is being employed in the particular embodiment whereby the optical connectors are locates so as to receive light transmission through the electrical backplane. Thus with the present invention the backplane assembly includes a chamber for carrying a set of optical fibers for connecting the optical connectors with the chamber being shaped and sized to match the transmission paths in the electrical back plane.

We claim:

1. An independently connectable backplane assembly comprising:

an electrical backplane including a connector shell having a plurality of mechanical connections for providing an electrical connection therethrough, said connector shell having a through opening therein;

an optical backplane connectably free of said electrical backplane for providing an optical transmission path therethrough, said optical backplane having an optical connector, said optical connector sufficiently sized and configured so as to be insertable in said opening in the electrical backplane so as to permit side by side attachment or reattachment of said optical backplane to a system attached to said connector shell without having to disconnect said electrical backplane therefrom.

2. The backplane assembly of claim 1 wherein the connector shell contains a plurality of openings for receiving multiple optical connectors.

3. The backplane assembly of claim 1 wherein the optical backplane includes a base for holding the optical connectors in a spaced position for gang attachment or reattachment and a chamber for carrying a set of leads for the optical connectors.

4. The backplane assembly of claim 1 wherein the electrical backplane includes mechanical pin connectors.

5. The backplane assembly of claim 1 wherein the electrical backplane includes fasteners for securing the electrical backplane as a unit.

6. The backplane assembly of claim 5 wherein the fasteners comprise threaded members.

7. The backplane assembly of claim 1 wherein there is sufficient clearance between the optical connectors and the electrical backplane so that the optical connectors are surrounded but not carried by the electrical backplane.

8. The backplane assembly of claim 1 wherein the electrical backplane includes a plurality of mechanical pin connectors ganged together with a plurality of mechanical pin connectors having mechanical pin connectors and an opening therein for receiving an optical connector.

9. The backplane assembly of claim 8 wherein the electrical backplane includes at least one ganged connector having only openings for receiving optical connectors.

10. The backplane assembly of claim 1 wherein said optical backplane includes a chamber for carrying a set of optical fibers for connecting said optical connectors and said chamber is shaped and sized to match the transmission paths in said electrical back plane.

11. The backplane assembly of claim 10 wherein said optical backplane includes a chamber for carrying a set of optical fibers for connecting said optical connectors and said chamber is shaped and sized to match the transmission paths in said electrical backplane.

12. A backplane assembly comprising:
   a first backplane including a connector shell having a plurality of openings therein, said first backplane providing a first connecting network through a plurality of connectors in said connector shell;
   a second backplane for providing a second connecting network, said second backplane having a connector, said connector on said second backplane sufficiently sized so as to be insertable in said plurality of openings in the connector shell so as to permit attachment or reattachment of said second backplane to a system attached to said first backplane without having to disconnect said first backplane therefrom.

13. A base for forming mechanical and electrical attachment to an electrical device, said base including a through opening; and
   A connector, said connector for forming an optical connection with the electrical device with said connector sufficiently sized so as to be insertable through the opening in the base to enable the connector to be attached or detached to the electrical device while the base remains connected to the electrical device.

* * * * *